United States Patent [19]

Engelbrecht et al.

[11] Patent Number: 5,164,216

[45] Date of Patent: Nov. 17, 1992

[54] MICROWAVEABLE BREAD PRODUCT

[75] Inventors: Dale A. Engelbrecht, St. Louis; Ronald D. Spies, Creve Coeur, both of Mo.

[73] Assignee: Continental Baking Company, St. Louis, Mo.

[21] Appl. No.: 751,976

[22] Filed: Aug. 29, 1991

[51] Int. Cl.⁵ .................. A21D 13/00; A21D 15/00
[52] U.S. Cl. ................... 426/549; 426/19; 426/21; 426/241; 426/243
[58] Field of Search ............. 426/549, 243, 241, 19, 426/21

[56] References Cited

U.S. PATENT DOCUMENTS

| | | |
|---|---|---|
| 1,204,281 | 11/1916 | Kohman et al. |
| 1,831,728 | 11/1981 | Working |
| 2,509,927 | 5/1950 | Johnston |
| 2,871,124 | 1/1959 | Kuhrt et al. |
| 3,697,294 | 10/1972 | Asarum |
| 3,734,748 | 5/1973 | Ueno et al. |
| 3,949,093 | 4/1976 | Mehltretter et al. |
| 4,160,848 | 7/1979 | Vidal et al. |
| 4,463,020 | 7/1984 | Ottenberg ......................... 426/243 |
| 4,798,733 | 1/1989 | Kaneko et al. |
| 4,842,876 | 6/1989 | Anderson et al. |
| 4,857,353 | 8/1989 | Jakson ............................. 426/554 |
| 4,885,180 | 12/1989 | Cochran et al. |
| 5,015,486 | 5/1991 | Franssell et al. ................. 426/554 |

OTHER PUBLICATIONS

Kimbrell article "Microwave Ovens Provide New Opportunities for Bakery Companies", Bakery, Nov. 1987, p. 19.

Lorenz et al. article "Baking With Microwave Energy", Food Technology, 1973, pp. 27-32.

Anonymous article "Lot of Work and Research Went into Zappetites Debut" World Food and Drink Report, Oct. 8, 1987.

Moore article "Microwave Pizza Bows in Test Market; New Protein System Makes Crispy Crust", Food Product Revie, 13(10):20 (1979).

Peleg article "Texture Profile Analysis Parameters Obtained by an Instron Universal Testing Machine", Journal of Food Science, vol. 41, pp. 721-722 (1976).

Bourne article "Texture Profile Analysis", Food Technology, Jul., 1978, pp. 62-72.

Primary Examiner—Jeanette Hunter
Assistant Examiner—Mary S. Mims
Attorney, Agent, or Firm—Virgil B. Hill

[57] ABSTRACT

The present invention discloses a fully baked pan bread product which will substantially retain its palatability upon microwave heating. The improvement is accomplished by the inclusion in the bread formulation of shortening in a concentration of from about 7% to about 15% on a percent on flour basis and of fiber in a concentration of from above 2.0% or more on a percent on flour basis.

6 Claims, 2 Drawing Sheets

Fig.-1

| ITEM | FLOUR TYPE | FAT* LEVEL (%) | WATER* (%) | FAT INCORP. METHOD | DEGREE OF DEVELOPMENT | CHARACTERISTICS |
|---|---|---|---|---|---|---|
| FRENCH ITALIAN VIENNA BREADS | HARD | 0-1.5 | 35-40 | FORMULA | HIGH | CHEWY CRUMB |
| WHITE PAN BREADS | HARD | 1.5-5.0 | 30-40 | FORMULA | HIGH | TENDER, SHORT CRUMB |
| SWEET ROLLS | HARD AND SOFT BLENDS | 10-15 | 20-30 | FORMULA | HIGH | VERY SOFT CRUMB |
| PASTRIES | HARD AND SOFT BLENDS | 30-45 | 10-25 | LAMINATION | HIGH | FLAKY, MANY LAYERS |
| PIE CRUST | SOFT | 20-40 | 16-20 | CUT INTO FORMULA | VERY LOW | FLAKY, TENDER |
| BISCUITS | HARD AND SOFT BLENDS | 2.5-20 | 20-35 | CUT INTO FORMULA OR LAMINATION | LOW-MED. | TENDER, FLAKY LAYERS |

*DOUGH WEIGHT BASIS

MICROWAVEABLE BREAD PRODUCT

BACKGROUND OF THE INVENTION

1. Field of the Invention

This invention relates to farinaceous shelf-stable pan breads which, when reheated in a microwave oven, will retain their palatability and have extended table life. The products possess a crust and a crumb with a texture more closely equivalent to freshly baked pan bread products when reheated in a microwave oven.

2. Description of Related Art

Toughness in a bread product can be defined and assessed in sensory terms as a leathery or rubbery eating texture. For example, a bagel is tough while a croissant is tender. Firmness can be defined and assessed in sensory terms as the force required to bite through the sample without tearing or pulling. A "stale" dough-based product can be characterized as firm while fresh bread immediately after conventional cooking would be considered nonfirm.

Whether or not a product is tough or firm or, more accurately, is objectionably tough or firm, depends on the product type and the consumer. For example, the expectation for bread is that it should be soft and not tough. If bread had a bagel texture it would be objectionable because of the toughness. However, a bagel, even though it is tough, is not objectionable because the expectation is for a product that has a tough texture. Thus, the type of product and the consumer will set the standard for what level of toughness or firmness is objectionable or desirable.

The modern consumer of processed food is seeking a high quality food product with a minimum of preparation. This desire has led to the widespread utilization of microwave ovens in the average American household and the use of microwave ovens to heat machine vendable food products. While microwave energy will rapidly heat most food products, not all microwave heated products are able to deliver the same quality as is characteristic of the more traditional conduction oven heated counterpart. This lack of quality is quite prevalent in the area of microwave reheated baked goods.

Problems have arisen with the use of microwave energy for reheating traditional yeast-raised, wheat-based products such as bread and roll products. In particular, traditional bread products become less palatable after short exposures to microwave energy. The term palatable or palatability refers to the eating quality of food products. Palatable food products are agreeable to the taste and possess an appetizing appearance and texture.

For example, upon exposure to microwave energy, the crust of traditional bread and roll products becomes extremely tough and/or soggy as water present within the baked good migrates to the surface crust, but does not evaporate off. The crust of such microwave exposed bread products may become so tough that it is difficult to tear such products. The bread product itself may become soggy or develop hard lumpy portions, and the crumb of the bread product may become rubbery and gummy, and difficult to chew. Consequently, traditional bread and roll products, upon exposure to microwave energy, are not palatable.

To solve this problem, the food industry has pursued many varied avenues of research. Cochran et al. report in U.S. Pat. No. 4,885,180 that the toughness and firmness which occurs in baked goods due to exposure to microwave radiation can be reduced by the incorporation into the baked good of an effective amount of a chemically-modified starch. In another approach, it has been reported that Oscar Mayer & Co. has used a specific type of starch, and a precise ratio of starch to fat to flour in the dough to produce a microwaveable sandwich (Anonymous, 1987). Along the same lines, it has been reported that fat, in combination with other substances, allegedly reduced toughness in microwaveable dough-based items (Kimbrell, 1987). The tenderizing effect of fat has been attributed to the "shortening effect."

Anderson et al., U.S. Pat. No. 4,842,876 (hereinafter referred to as Anderson), report that the toughness and firmness that results from reheating or cooking starch-based bread-like products in a microwave oven can be reduced by controlling the amount of moisture loss, the cooling rate and the cooling time of a microwave heated product.

While it has been reported that fat, in combination with other substances, allegedly reduces toughness in microwaveable dough-based items, this toughness cannot be solved merely by adding more fat to product formulas. Minor changes in the formula or process can change the product identity of a bread product from one product to another product. For example, further development of a biscuit dough will produce a baked product which is more of a bread, and frying of a yeast leavened product will produce a doughnut while baking of the same yeast leavened dough will produce a bread-like product.

Additional factors may affect product identity. Some of these factors include, for example: type of fat; type of leavener; dough formation method; method of fat inclusion; method of cooking the product e.g., steaming, frying, baking, etc.; method of assembling the dough product, for example, laminating versus nonlaminating, etc. These and other related factors and principles are discussed in Hoseney (1986). Further, the same cereal grain can provide major differences in the product. For example, changing from a soft wheat to a hard wheat can significantly change the product identity. Dough-based and batter-based products may be prepared from one cereal grain flour or mixtures of several cereal grain flours. For dough-based products, the cereal flour should be capable of forming a viscoelastic continuous protein matrix upon hydration. Thus, a careful balance must be made in the processing and the formula to solve product problems and not change the product identity.

SUMMARY OF THE INVENTION

The present invention is a baked pan bread product which contains critical levels of shortening and fiber incorporated into the pan bread formulation. It has been surprisingly found that incorporation of levels of fat near, and slightly above, the high end of the product identity fat level range reported by Anderson for a pan bread, along with the incorporation of fiber in the bread formulation, especially reduces the toughness caused by microwaving a pan bread product. The soft, stable crumb and crust of the microwaveable pan bread product of the present invention is achieved by the inclusion in the bread formulation of shortening in a concentration of from about 7% to about 15% on a percent on flour basis and of fiber in a concentration of above 2.0% or more on a percent on flour basis.

These critical levels of shortening and fiber render the pan bread product capable of being microwaved without acquiring an unacceptable texture and without changing its product identity.

BRIEF DESCRIPTION OF THE FIGURES

FIG. 1 graphically illustrates different product identities and the corresponding product characteristics.

DETAILED DESCRIPTION OF THE INVENTION

Figure 2:
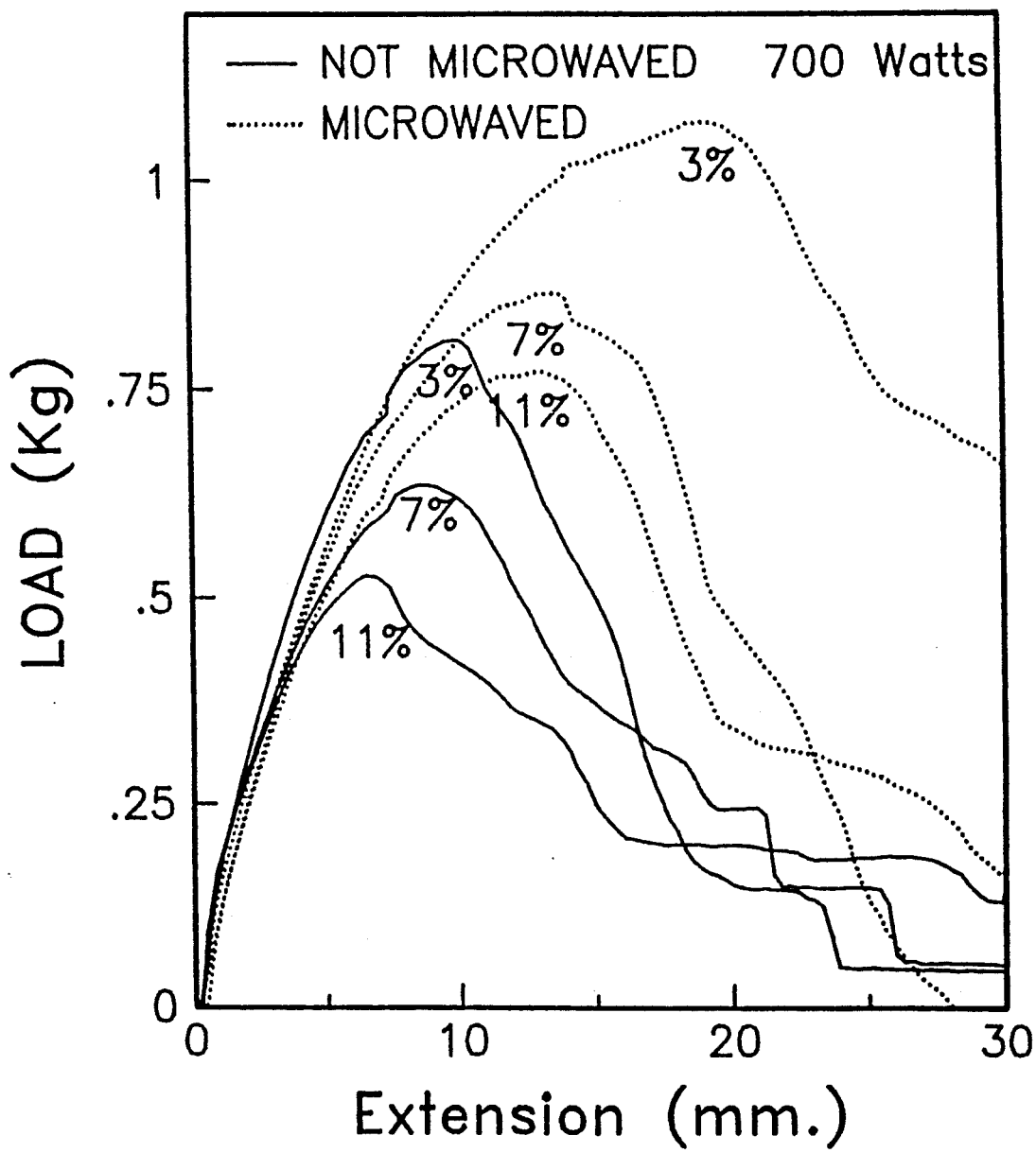
FIG. 2 graphically illustrates the effect of different fat levels on toughening.

The principal ingredient parameters and product characteristics for various types of farinaceous products are shown in FIG. 1, which is taken from Anderson et al., U.S. Pat. No. 4,842,876. As indicated, white pan breads, to which the present invention relates, have the following ingredient parameters and product characteristics:

| | |
|---|---|
| flour type | hard (high protein content); |
| fat level | 1.5%–5.0% (dough weight basis); |
| water level | 30%–40%; |
| fat incorporation method | into bread formula; |
| degree of development | high; and |
| characteristics | a tender, short crumb. |

In the preferred embodiment, the bread product of the present invention includes shortening in a concentration of from about 7% to about 15% on a percent on flour basis and fiber in a concentration of above 2% or more on a percent on flour basis. These critical levels of shortening and fiber render the pan bread product, when produced in "pup loaf" size, capable of being microwaved without acquiring an unacceptable texture and without changing its product identity. A "pup loaf" is a pan bread product which is around one fourth the size of a standard pan bread product which is usually around 16 ounces in weight. Unless otherwise noted, all percentages refer to baker's weight percents wherein the weight of each non-flour ingredient contained in the baked good formulation is expressed as a weight percent of the flour ingredient of the formulation.

The level of shortening in the formulation may be achieved by incorporating the desired amount of butter, oil or lard in the desired amount. The level of fiber in the formulation is achieved through the addition of sufficient fiber to give the formulation a fiber concentration of above 2.0% or more on a percent on flour basis. It is believed that fiber levels of above 15% in the bread formulation will make it difficult to maintain the structural integrity of the bread. It also is believed that soluble and insoluble fibers, and natural and synthetic fibers, work equally as well as supplemental fiber. Among the possible sources for the fiber is oat bran, wheat bran, soy polysaccharide, psyllium mucilloid, methyl cellulose, and polydextrose.

FIG. 2 illustrates the inverse proportionality between fat concentration and microwave toughening. One inch thick slices of pan bread were impaled on a bed of spikes and pulled apart by an Instron Universal Testing Instrument (Model 4201; Canton, Mass.). Data were collected using computerized data collection on an HP 1000 connected directly to the Instron. Breads of 3 fat levels were produced and tested (Table I). The formulas for the breads were the same except for the difference in fat levels: 3%, 7% and 11% on a percent on flour basis, which correspond to fat levels of 1.43%, 3.28% and 5.06% on a percent on dough basis as reported in FIG. 1 and in U.S. Pat. No. 4,842,876. The formulas each had a fiber concentration of 10.0% on a percent on flour basis. This level was achieved through the addition of 9.7% oat fiber to the formulation. Patent bread flour has an intrinsic fiber level of 0.3% on a percent on flour basis.

TABLE I

| | Experiment | | |
|---|---|---|---|
| Ingredient | 1 Weight | 2 Weight | 3 Weight |
| Flour, bread | 68.0 | 68.0 | 68.0 |
| Water | 54.5 | 54.5 | 54.5 |
| Gluten | 2.9 | 2.9 | 2.9 |
| Yeast | 2.4 | 2.4 | 2.4 |
| Yeast Food KC | 0.5 | 0.5 | 0.5 |
| SSL | 0.4 | 0.4 | 0.4 |
| Sourdough Base | 0.3 | 0.3 | 0.3 |
| Water | 18.9 | 18.9 | 18.9 |
| Flour, Hi Gluten | 29.1 | 29.1 | 29.1 |
| Oat Fiber, White | 9.7 | 9.7 | 9.7 |
| Sugar, Granulated | 8.5 | 8.5 | 8.5 |
| MFDM | 7.8 | 7.8 | 7.8 |
| Salt | 1.9 | 1.9 | 1.9 |
| Panatex | 1.1 | 1.1 | 1.1 |
| US500 | 0.3 | 0.3 | 0.3 |
| Ca Propionate | 0.2 | 0.2 | 0.2 |
| PS 40 Shortening | 3.0 | 7.0 | 11.0 |

Preparation Method

Mix 0.5 minutes at speed 1 then 9.5 minutes speed 2. Cooling jacket water temperature 68° F. Dough temperature after mixing, 80° F. Fermentation time 4 hours at 84° F. (wet), 86° F. (dry). Scale mass 145 grams for hot dog bun shape, 135 grams for pup loaf. Overhead proof 10 minutes. Moulder settings: top roll 0.15 inches, bottom roll 0.13 inches. Entry width 6.5 inches, exit width 5.75 inches. Entry height (pressure pad) 1.94 inches, exit height 1.94 inches. Proof time 25 minutes. Proof to 0.75 inches above edge of baguette pan or 0.5 inches above edge of pup-loaf pan. Bake at 390° F. for 21-22 minutes to an internal temperature of 205°–208° F.

Review of the data indicate that a pan bread product having a fat level slightly higher than 7% produces a similar peak load when microwaved to the peak load produced by an unmicrowaved pan bread product containing 3% fat. Analysis of the area under the respective curves, however, indicates that 11% fat would probably produce a pan bread which, when microwaved, would be even more similar in texture to a 3% unmicrowaved pan bread. Therefore, the data indicate that pan bread products having fat levels in a concentration of around 11% on a percent on flour basis enhance the palatability of microwaved pan bread. It is expected that incorporation of fat levels up to about 15% on a percent on flour basis (in the present formulation, such a percentage would equate to 6.77% on a dough weight basis) would result in similar enhancement of microwaveability of pan breads without significantly changing the product identity from a pan bread.

In addition to these findings, however, it has been surprisingly found that incorporation of critical levels of fiber, along with the above-indicated levels of fat, in a pan bread formulation, result in the creation of a pan bread product having even better post-microwave texture.

Breads of 4 fiber levels were produced (Table II). The formulas for the breads were the same except for the difference in fiber levels: 0%, 2%, 5% and 10% on a percent on flour basis. The formulas each had a fat concentration of 11.0% on a percent on flour basis. The pup loaf pan bread with "zero" percent added fiber in the bread was the control. Firmness of the bread was then measured mechanically by following the protocol described in Peleg, M., "Texture Profile Analysis Parameters Obtained by an Instron Universal Testing Machine," *J. Food Sci.* 41:721-22 (1976). The Texture Profile Analysis (TPA) determines the force needed to compress a slice of bread as a function of fiber content and subjection to microwaving. This data is illustrated in Table III.

TABLE II

| Ingredient | Example 1 Weight | Example 2 Weight | Example 3 Weight | Example 4 Weight |
|---|---|---|---|---|
| Flour, Patent | 670.00 | 670.00 | 670.00 | 670.00 |
| Water | 387.50 | 441.50 | 522.50 | 657.50 |
| Gluten | 30.00 | 30.00 | 30.00 | 30.00 |
| Yeast | 25.00 | 40.00 | 40.00 | 40.00 |
| Yeast Food KC | 5.00 | 5.00 | 5.00 | 5.00 |
| Sourdough Base | 3.00 | 3.00 | 3.00 | 3.00 |
| Soy Polysaccharide (fiber) | | 20.00 | 50.00 | 100.00 |
| Flour, Hi Gluten | 300.00 | 300.00 | 300.00 | 300.00 |
| Water | 189.00 | 189.00 | 189.00 | 189.00 |
| Butter, Flavor Up | 110.00 | 110.00 | 110.00 | 110.00 |
| Sugar, Granulated | 88.00 | 88.00 | 88.00 | 88.00 |
| NFDM | 40.00 | 40.00 | 40.00 | 40.00 |
| Salt | 20.00 | 20.00 | 20.00 | 20.00 |
| Panatex | 10.00 | 10.00 | 10.00 | 10.00 |

Preparation Method

Sponge: Mix ½ minute—speed 1, 4 minutes—speed 2. Cooling water at 68° F. Ferment 3.5 hours at 84°/78° F. (dry/wet). Mix dough ½ minute—speed 1. Add sponge. Mix ½ minute—speed 1; 5 minutes—speed 2. Floor time 10 minutes. Scale 134.7 grams, round and mold using settings of: top roll—0.50 inches, bottom roll—0.25 inches, feed width—3⅜ inches, enter width 6 inches, exit width—5 inches, enter height—1¼ inches, and exit height—1⅜ inches.

Proof 55-60 minutes at 110°/108° F. (dry/wet) to ¼ to ½ inch above edge of pan. Bake at 400° F. for 17 to 18 minutes (internal temperature 206° F.).

TABLE III

| TEXTURE PROFILE ANALYSIS | | | | | | | | |
|---|---|---|---|---|---|---|---|---|
| | Percent Fiber | | | | | | | |
| | 0 | | 2 | | 5 | | 10 | |
| Microwaved? | no | yes | no | yes | no | yes | no | yes |
| Hardness | 0.34 | 0.38 | 0.32 | 0.39 | 0.28 | 0.32 | 0.33 | 0.33 |

Review of the data illustrated in Table III indicates that the degree of hardness is related to the amount of fiber in the bread. Hardness refers to the maximum force needed to compress a slice of bread to 50% of its original thickness. Specifically, prior to exposure to microwave energy, the slice of bread from the control loaf having a fiber level of 0% required 0.34 kilograms of force to compress it. After microwaving, however, the amount of force needed was 0.38 kilograms. This indicates a toughening of the bread following the subjection to microwave energy even with an 11% level of fat contained in the bread formulation.

With 2% fiber, the unmicrowaved bread was less tough than the same unmicrowaved bread with no added fiber. The toughening of the bread following the subjection to microwave energy shown with 0% fiber was still evident at 2% fiber though the bread was actually tougher after microwaving than at 0% fiber. In addition, there was greater disparity between the unmicrowaved and microwaved pan bread product at the 2% fiber level.

At 5% fiber levels, the pan bread was less tough, both microwaved and unmicrowaved than the 0% fiber bread. In addition, the 5% fiber level microwaved bread was less tough than the 0% fiber level unmicrowaved bread. The same degree of toughening caused by microwaving at 5% fiber levels as was caused at 0% fiber levels.

Fiber levels of 10% also produced a product which was less tough both microwaved and unmicrowaved than the 0% fiber unmicrowaved bread. In addition, the bread with fiber level of 10% had the same texture both before and after microwaving.

Analysis of the data indicate that at some point above 2% fiber content, pup loaf pan bread products obtain enhanced post-microwave characteristics, thus enhancing the palatability of microwaved pan bread. While not wishing to be limited to a specific theory, the present inventors believe that the microwave tolerance brought about by the incorporation of above 2.0% fiber may be due to the moisture retention capabilities of the fiber. In addition, upon heating in a microwave, high gluten fiber gets tough and rubbery. It is postulated that the fiber needles disrupt the continuous high gluten flour matrix thus weakening the strength of that matrix.

The above experiments were performed on 4 ounce pup loaf pan breads. During experiments with pan breads larger than the pup loaves, however, it was observed that unacceptable toughening still occurred following exposure to microwave energy. The present inventors attribute this toughening to the longer exposure times required for the larger loaves to reach the same internal temperature as the pup loaf breads. The present inventors further postulate that the beneficial effects produced by the critical levels of fat and fiber disclosed herein for a pup loaf pan bread still occur in standard pan breads upon their exposure to microwave energy, but these beneficial effects are not sufficient to overcome the toughening which occurs in a standard pan bread upon its reheating in a microwave. In other words, standard pan breads incorporating the critical levels of fat and fiber as disclosed herein will be unacceptably tough following exposure to microwave energy, but less tough than those standard pan bread formulations not including amounts of fat and fiber within the disclosed critical levels.

The foregoing detailed description is given for clearness of understanding only, and no unnecessary limitations should be understood therefrom, as modifications within the scope of the invention will be apparent to those skilled in the art.

The embodiments of the invention in which an exclusive property or privilege is claimed are defined as follows. What is claimed is:

1. An improved shelf stable baked pan bread which will substantially retain its tenderness upon microwave reheating wherein the improvement comprises the inclusion into the pan bread formulation of shortening in a concentration of from about 7% to about 15% on a percent on flour basis and of fiber in a concentration of above 2.0% or more on a percent on flour basis to substantially reduce the tendency of pan bread to toughen upon microwave reheating whereby the baked and reheated pan bread closely resembles a freshly baked pan bread.

2. The pan bread of claim 1 wherein said concentration of fiber is from about 5% to about 15%.

3. The pan bread of claim 1 wherein said concentration of fiber is about 10%.

4. The pan bread of claim 1 wherein said shortening concentration is about 11%.

5. The pan bread of claim 4 wherein said concentration of fiber is from about 5% to about 15%.

6. The pan bread of claim 4 wherein said concentration of fiber is about 10%.

* * * * *